March 11, 1969  L. E. BULLER  3,432,189

FLEXMASTER END RESTRAINT

Filed March 21, 1966

INVENTOR
LEONARD E. BULLER

BY

*Jerry K. Harning* his ATTORNEY

United States Patent Office 3,432,189
Patented Mar. 11, 1969

3,432,189
FLEXMASTER END RESTRAINT
Leonard E. Buller, Canoga Park, Calif., assignor to Aeroquip Corporation, Jackson, Mich.
Filed Mar. 21, 1966, Ser. No. 536,039
U.S. Cl. 285—232
Int. Cl. F16l 17/00, 19/00, 21/00
2 Claims

ABSTRACT OF THE DISCLOSURE

The invention relates to a fluid coupling, preferably between two plain pipe ends, which include rubber-like sealing gaskets compressed to provide seals. The gaskets are provided with grooves which receive restraining rings to prevent any relative axial movement between the pipe ends.

---

The invention relates to a coupling for use with pipes or tubes having plain ends and particularly relates to an improvement in the joint shown and described in U.S. patent application Ser. 111,341, now abandoned.

The most common means for coupling piping or tubing together employs threads or flanges which permit the pipe to be connected in sealed relation to the end of another pipe or to a fitting. Such coupling means require prior machining or fabrication of the pipe end and it is an object of the invention to provide a fluid coupling structure wherein a pipe having a plain nonmachined or nonfabricated end may be easily attached in a fluid tight connection to another pipe or fitting.

In the assembling of piping or conduit systems wherein rigid conduits are employed, a misalignment between components which are to be interconnected often exists, and bending or stressing of the conduit is usually necessary to produce the desired alignment. In the practice of the invention the coupling is capable of allowing for limited misalignment without effecting the efficiency of the sealing characteristics and providing improved means for end restraint.

The principal object of the invention is to provide a coupling for plain end conduits wherein the coupling is capable of absorbing and dampening vibrations imposed on the conduits and wherein the coupling is provided with means which substantially restrains the axial separation of the coupling and the pipe ends.

A further object of the invention is to provide a coupling for plain end conduits wherein the assembly of the coupling to the conduits is easily and quickly accomplished without extraordinary skill or special tools and wherein the coupling may be assembled and installed in close quarter areas.

Another object of the invention is to provide a fluid coupling for plain end conduits wherein the coupling employs elastomer gaskets which are maintained in intimate sealing relation with the conduits and the coupling is capable of compensating for angular misalignments, angular flexing and restricting axial separation of the pipe and coupling.

More particularly, the invention relates to annular metal rings of inverted U-shape cross-sectional configuration which are nested in the gaskets and which engage the ends of the pipes to restrain the tendency of axial separation of the coupling and pipe ends.

These and other objects of the invention arising from the details and the relationships of the components of an embodiment thereof will be apparent from the following description and accompanying drawings wherein.

Figure 1:
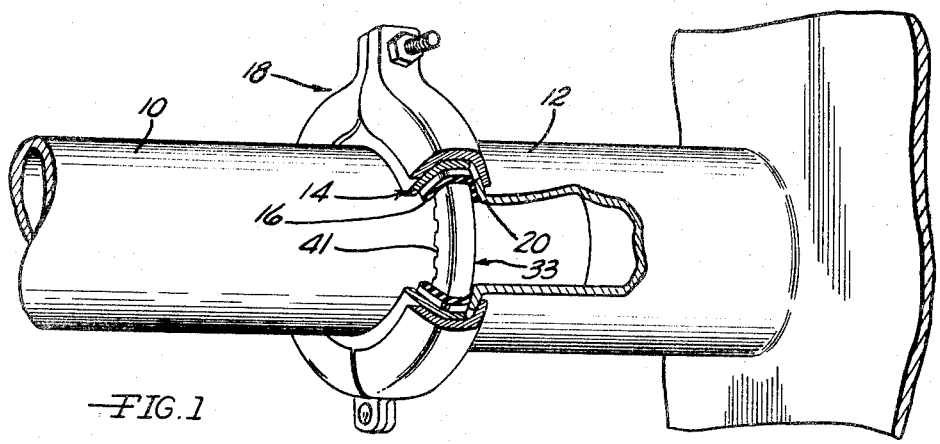
FIG. 1 is a perspective view of the coupling in accord with the invention having portions broken away to more clearly show the invention.
Figure 2:
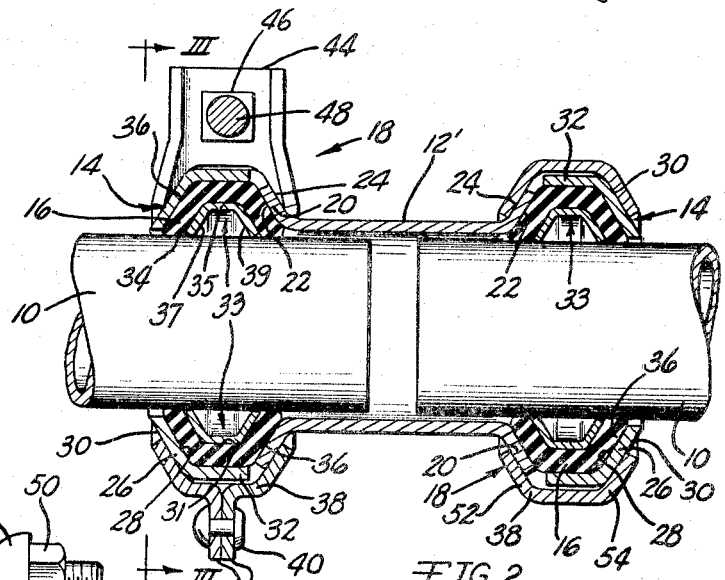
FIG. 2 is an elevational sectional view of an embodiment of a coupling for interconnecting two conduits in end-to-end relation.

The basic components employed with the coupling in accord with the invention are best shown in FIGS. 1 and 2 wherein the plain ended conduit, such as a pipe or tube, is indicated by the reference 10. A sleeve member 12 constitutes a part of the coupling itself and may be formed as a part of a storage tank, elbow, a pipe interconnector as in FIG. 2, or any conventional fitting used in fluid systems. An annular gasket retainer 14 is inserted over the end of the pipe 10 previous to the placing of the elastomer gasket 16 upon the pipe and the final assembly and sealing of the coupling is produced by the operation of the clamping means 18, as will be later described.

As will be apparent from FIGS. 1 and 2, the sleeve 12 is provided with an integral outturned flange 20 of conical configuration having an inner conical surface 22 and an outer conical surface 24. The gasket retainer member 14 consists of a rigid annular member having a radially extending wall 26 of conical configuration having an inner surface 28 and an outer surface 30. Retainer 14 is also provided with a cylindrical axially extending portion 32, which is formed integral with the wall 26, and is concentrically related to the conduit 10 when the coupling is assembled.

Upon the gasket retainer 14 being positioned as shown in FIG. 2 it will be appreciated that the inner surfaces 22 and 28 and the retainer portion 32 define an annular groove or chamber 33 adjacent the end of the sleeve 12 which has been inserted over the plain end of the conduit. The annular elastomer gasket 16 is located within this chamber. Gasket 16 may be formed of rubber, neoprene, or similar material which is capable of deforming upon compression and has good fluid resistant and sealing characteristics. Gasket 16 is formed with a bore 34 having a diameter substantially equal to that of the outside diameter of the pipe 10 and is also preferably provided with conical side walls 36 which are of an angle substantially corresponding to that of the surfaces 22 and 28 of the flange and retainer with which they are associated. The maximum diameter of the gasket substantially corresponds to the inner diameter of the cylindrical portion 32 of the retainer 14.

Figure 3:
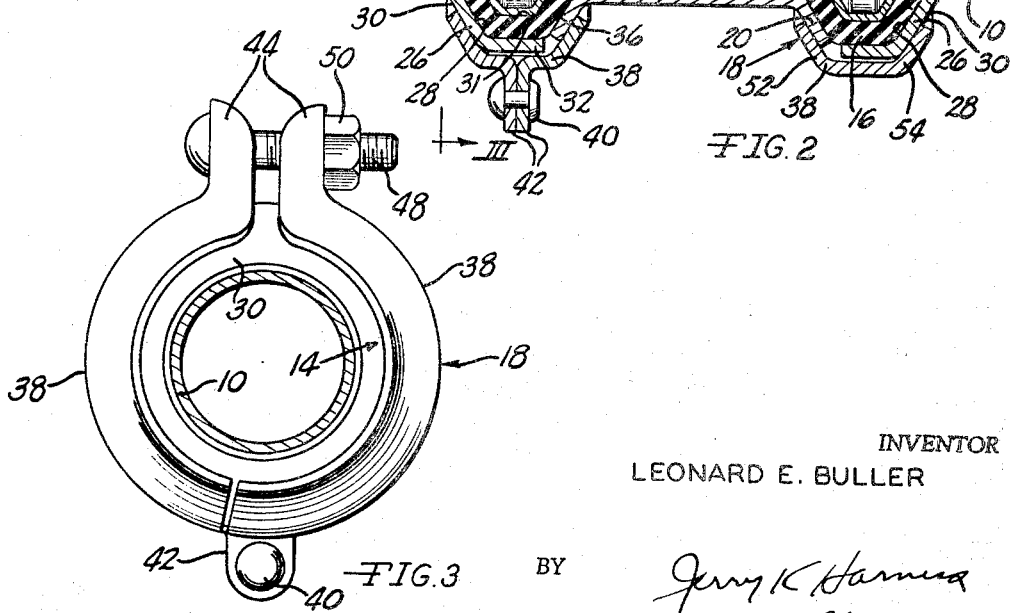
FIG. 3 is an elevational sectional view taken along section III—III of FIG. 2.

In the preferred embodiment the clamping member 18 consists of a pair of substantially semi-circular segments 38 which are pivotally connected together by a pivot pin 40 extending through ears 42 formed on the segments. The segments 38 are provided with radially extending projections 44 formed on the segments substantially diametrically opposed to the pivot 40 and holes 46 are defined in the projections for receiving the bolt 48. The bolt 48 is inserted through the holes of the projections and upon the tightening of the nut 50 it will be appreciated that the clamp member may be drawn to a closed position as shown in FIG. 3. The segments 38 preferably have a U cross section configuration as best shown by the right hand clamp illustrated in FIG. 2. In FIG. 2 the right hand clamp is illustrated as being rotated 90° with respect to the left clamp for purposes of illustration.

In accordance with the invention, the gasket 16 is provided at its bore 34 with an annular recess 31 which receives a metal ring 33 which may be split to facilitate insertion. The ring 33 is preferably formed of a metal such as stainless steel and is provided with a cylindrical bore portion 35 and oppositely inwardly extending conical side portions 37 and 39. The inner edges of the side portions 37 and 39 are preferably saw-toothed or notched as shown at 41 in FIG. 1.

The legs 52 and 54 of the segments are so shaped that they substantially correspond to the conical configuration of the outer flange surface 24 and the outer retainer wall surface 30, and it will be appreciated that as the segments are drawn toward each other by the bolt and nut arrangement the forces imposed on the flange 20 and the retaining wall 14 by the clamp segments will tend to move the flange and retaining member toward each other in an axial direction.

In assembling the coupling to a plain end conduit 10 the retaining member 14 is first slipped over the end of the conduit such that the portion 32 projects toward the conduit end. Thereupon, the elastomer gasket 16 carrying the ring 33 is positioned over the pipe end and located at the desired axial position therefrom. The sleeve member 12 is then inserted over the pipe end until the inner flange surface 22 engages the facing gasket side wall 36. Thereupon the retaining member 14 is moved into position against the gasket such that the inner surface 28 engages the other gasket side wall and the portion 32 overlaps the outer gasket surface.

The clamping member is then opened and placed over the flange and gasket retaining member such that one of the leg portions will engage the outer surface of the flange and the other leg portion will engage the outer surface of the gasket retainer wall. The bolt 48 is inserted through the holes of the projections and the nut 50 is placed on the bolt and tightened. As the clamp segments 38 are drawn toward each other and the clamp member is radially contracted, the axial forces will be imposed on the retainer 14 and flange 20 to compress the gasket 16 and urge the inner edges of the ring 33 into contact with the pipe 10. In that the gasket 16 is confined within the chamber 33 by the rigid components defining the chamber, the direction of expansion of the inner opposite surfaces of the gasket will be radially inwardly against the conduit 10. Thus, it will be appreciated that a fluid tight connection will be established between the gasket and conduit and also between the flange and the gasket.

The action of the clamp segments 38 compressing the gasket 16 also urges the inner edges of the ring 33 into biting engagement with the pipe 10. The saw-toothed configuration of these edges further enhances this biting action. The use of the ring 33 in the construction shown and described provides what is known as end restraint and thereby greatly restrict any relative axial movement between the pipe and the coupling body. With reference to FIGS. 1 and 2 with respect to the coupling body the inner edge of the conical portion 39 primarily restricts movement of the pipe 10 in a leftward direction while the inner edge of the conical portion 37 restricts movement of the pipe 10 in the rightward direction.

In FIG. 2 the inventive concept is illustrated in a coupling for connecting pipes in end-to-end relation and the sleeve member 12' is provided with a flange at each end.

As will be apparent from FIG. 2, the preferred inner diameter of the sleeve member is slightly larger than the outer diameter of the conduit, and likewise, the minimum diameter of the gasket retainer is also larger than the conduit outer diameter. This construction insures that the only part of the coupling engaging the conduits are the elastomer gaskets and the related metal rings, and hence, limited misalignment and axial flexing of the axis of the conduit with respect to the axis of the sleeve is possible due to the elastic nature of the gasket. Also, this construction permits the gasket to dampen and absorb vibrations occuring within the conduit.

An important advantage of the inventive structure over known couplings lies in its ease of assembly to the conduit, and it will be appreciated that the only tool required to establish the coupling action is a wrench to tighten the nut 50. The coupling components may be constructed of very economically produced components such as stamped steel parts, and the manufacturing processes required are conventional.

I claim:
1. In combination, a cylindrical conduit, a tubular sleeve having an end portion telescoped over the end of said conduit, said end portion being flared to form a generally radially outwardly extending conical extension, an annular elastomer gasket disposed around and engaging said conduit adjacent the end portion of said sleeve, said gasket having a generally frusto-conical cross sectional configuration providing a radially outer cylindrical center surface with first and second conical faces depending therefrom, said first conical face being generally parallel to and engaging said flared extension of said sleeve, a retainer ring disposed around said gasket having a cylindrical portion engaging substantially all the cylindrical outer surface of said gasket and a conical portion the inner surface of which is generally parallel to and engages said second conical face of said gasket, said conical portion having a minimum diameter greater than the outer diameter of said conduit, said gasket having an annular groove in its radial inner surface defined by walls generally parallel to the cylindrical outer center surface and said first and second conical faces of said gasket, restraining means comprising a sheet metal ring of frusto-conical cross sectional configuration nestled within said groove and having a central cylindrical portion and depending conical leg portions the outer surfaces of which engage substantially the entire surface of the interior walls of said groove, the depending edges of said leg portions engaging said conduit in biting contact therewith, and annular clamping means deposed around said gasket having clamping surfaces engaging the outer surfaces of said flared extension and said conical portion of said retainer ring wherein tightening of said clamping means compresses said gasket between the inner surface of said flared extension and said conduit to provide a seal and urges said restraining means against said conduit to restrain axial movement of said conduit with respect to said sleeve.

2. The combination of claim 1 wherein the edges of said sheet metal ring are notched to improve the biting contact with said conduit.

References Cited

UNITED STATES PATENTS

| 3,058,762 | 10/1962 | Howe | 285—340 X |
| 1,782,484 | 11/1930 | Spencer et al. | |
| 1,830,782 | 11/1931 | Burnish et al. | 285—367 X |
| 2,201,372 | 5/1940 | Miller | 285—340 |
| 2,613,086 | 10/1952 | Wolfram | 285—348 X |
| 3,151,775 | 10/1964 | Whitehead | 285—411 X |

FOREIGN PATENTS

| 571,099 | 2/1959 | Canada. |
| 1,421,443 | 11/1965 | France. |
| 779,959 | 7/1957 | Great Britain. |

CARL W. TOMLIN, Primary Examiner.

D. W. AROLA, Assistant Examiner.

U.S. Cl. X.R.

285—340, 348, 366, 369